(12) United States Patent
Nakano et al.

(10) Patent No.: US 9,508,019 B2
(45) Date of Patent: Nov. 29, 2016

(54) OBJECT RECOGNITION SYSTEM AND AN OBJECT RECOGNITION METHOD

(71) Applicant: HONDA MOTOR CO., LTD., Tokyo (JP)

(72) Inventors: Mikio Nakano, Wako (JP); Hitoshi Nishimura, Kobe (JP); Yuko Ozasa, Kobe (JP); Yasuo Ariki, Kobe (JP)

(73) Assignees: HONDA MOTOR CO., LTD., Tokyo (JP); NATIONAL UNIVERSITY CORPORATION KOBE UNIVERSITY, Kobe (JP)

( * ) Notice: Subject to any disclaimer, the term of this patent is extended or adjusted under 35 U.S.C. 154(b) by 93 days.

(21) Appl. No.: 14/190,539

(22) Filed: Feb. 26, 2014

(65) Prior Publication Data

US 2014/0249814 A1  Sep. 4, 2014

(30) Foreign Application Priority Data

Mar. 1, 2013 (JP) ................................. 2013-040780

(51) Int. Cl.
*G10L 15/00* (2013.01)
*G06K 9/46* (2006.01)
*G10L 25/54* (2013.01)

(52) U.S. Cl.
CPC ............ *G06K 9/4676* (2013.01); *G10L 15/00* (2013.01); *G10L 25/54* (2013.01)

(58) Field of Classification Search
CPC .... G10L 15/00; G10L 15/24; G06K 9/00496
See application file for complete search history.

(56) References Cited

U.S. PATENT DOCUMENTS

| | | | |
|---|---|---|---|
| 8,671,069 B2* | 3/2014 | Chang et al. | 706/52 |
| 8,849,058 B2* | 9/2014 | Kennedy et al. | 382/274 |
| 2002/0158599 A1* | 10/2002 | Fujita et al. | 318/568.11 |
| 2005/0102139 A1* | 5/2005 | Fukada | 704/235 |

(Continued)

FOREIGN PATENT DOCUMENTS

JP 3434976 B2 5/2003

OTHER PUBLICATIONS

D. Roy and A. Pentland, "Learning words from natural audio-visual input", Proc. Int. Conf. Spoken Language Processing, vol. 4, pp. 1279-1283 1998.*
Yuko Ozasa et al., "Disambiguation in Unknown Object Detection by Integrating Image and Speech Recognition Confidences," ACCV, 2012, pp. 1-12.

*Primary Examiner* — Douglas Godbold
(74) *Attorney, Agent, or Firm* — Squire Patton Boggs (US) LLP

(57) ABSTRACT

An object recognition system is applicable to practical use, and utilizes image information besides speech information to improve recognition accuracy. The object recognition system comprises a speech recognition unit to determine candidates for a result of speech recognition on input speech and their likelihoods, and an image model generation unit to generate image models of a predetermined number of the candidates having the highest likelihoods. The system further comprises an image likelihood calculation unit to calculate image likelihoods of input images based on the image models, and an object recognition unit to perform object recognition using the image likelihoods. At the time of generating the image model of the candidate, the image model generation unit first searches an image model database, and, when the image model of the candidate is not found in the database, the image model generation unit generates said image model from image information on the web.

5 Claims, 3 Drawing Sheets

(56) References Cited

U.S. PATENT DOCUMENTS

| | | |
|---|---|---|
| 2005/0132420 A1* | 6/2005 | Howard et al. ............... 725/135 |
| 2005/0240412 A1* | 10/2005 | Fujita ........................... 704/270 |
| 2007/0188657 A1* | 8/2007 | Basson et al. ................ 348/468 |
| 2010/0201793 A1* | 8/2010 | Kurzweil et al. ............... 348/62 |
| 2012/0089552 A1* | 4/2012 | Chang et al. ................... 706/52 |
| 2013/0060566 A1* | 3/2013 | Aoyama et al. .............. 704/231 |
| 2014/0039871 A1* | 2/2014 | Crawford ......................... 704/2 |

* cited by examiner

OBJECT RECOGNITION SYSTEM AND AN OBJECT RECOGNITION METHOD

FIELD OF THE INVENTION

This invention relates to a system and a method for object recognition, which may be used in a robot, for example.

BACKGROUND OF THE INVENTION

When a robot performs some tasks in a living environment, the robot is required to be capable of performing at least an object grasping task which is a task to grasp an object specified by a user. For this purpose, the user provides an instruction to the robot usually by voice. And then, the robot performs object recognition based on a result of speech recognition. The robot may also obtain image information about objects in its surrounding area. As an object recognition method for the object grasping task, a method using integration of speech information and image information is proposed (Non-Patent Document 1). However, in the method proposed in the Non-Patent Document 1, both of speech models and image models are necessary for the object recognition. Thanks to the improvement of a large vocabulary dictionary, it is easy to hold the speech models. But a preparation of a large number of image models is extremely difficult and unrealistic. Therefore, the method proposed in Non-Patent Document 1 has not been applied for a practical use.

PRIOR ART DOCUMENT

Non-Patent Document 1: Y. Ozasa et al., "Disambiguation in Unknown Object Detection by Integrating Image and Speech Recognition Confidences" ACCV, 2012

SUMMARY OF THE INVENTION

Problem to be Solved

As described above, an object recognition system and an object recognition method utilizing image information besides speech information have not been applied for a practical use. Therefore, there are needs for an object recognition system and an object recognition method applicable to a practical use, which utilize image information besides speech information to improve the recognition accuracy.

Solution to the Problem

An object recognition system according to a first aspect of the present invention comprises a processor and one or more memories. And the processor is configured to determine candidates for a result of speech recognition on input speech and their speech likelihoods, generate image models of a predetermined number of the candidates having the highest speech likelihoods, calculate, based on the image models, image likelihoods that input images correspond to each of the predetermined number of the candidates, and perform object recognition using the image likelihoods. And, in the step of generating image models, the processor searches an image model database, and then, when the image model of the candidate is not found in the database, the processor generates said image model from image information on the web.

According to the first aspect, by utilizing image information on the web, the object recognition system applicable to a practical use, which uses image information besides speech information, is provided.

In an object recognition system according to a first embodiment of the first aspect, the processor performs the object recognition based on the speech likelihoods and the image likelihoods.

According to the first embodiment, the recognition rate may be improved by performing the recognition based on the speech likelihoods and the image likelihoods.

In an object recognition system according to a second embodiment of the first aspect, at the time of generating the image models of the candidates from image information on the web, the processor performs clustering of feature amounts of images collected from the web, and generates an image model for each of clusters.

According to the second embodiment, at the time of generating the image models of the candidates from image information on the web, the calculation amount may be reduced, compared with that in a method using a graph structure, for example.

An object recognition method according to a second aspect of the present invention comprises a step of determining candidates for a result of speech recognition on input speech and their likelihoods, and a step of generating image models of a predetermined number of the candidates having the highest likelihoods. The method further comprises a step of calculating, based on the image models, image likelihoods that input images corresponds to each of the predetermined number of the candidates and a step of performing object recognition using the image likelihoods. And, in the step of generating image models, an image model database is first searched, and then, when the image model of the candidate is not found in the database, said image model is generated from image information on the web.

According to the second aspect, by utilizing image information on the web, the object recognition method applicable to a practical use, which uses image information besides speech information, is provided.

DESCRIPTION OF EMBODIMENTS

Figure 1:
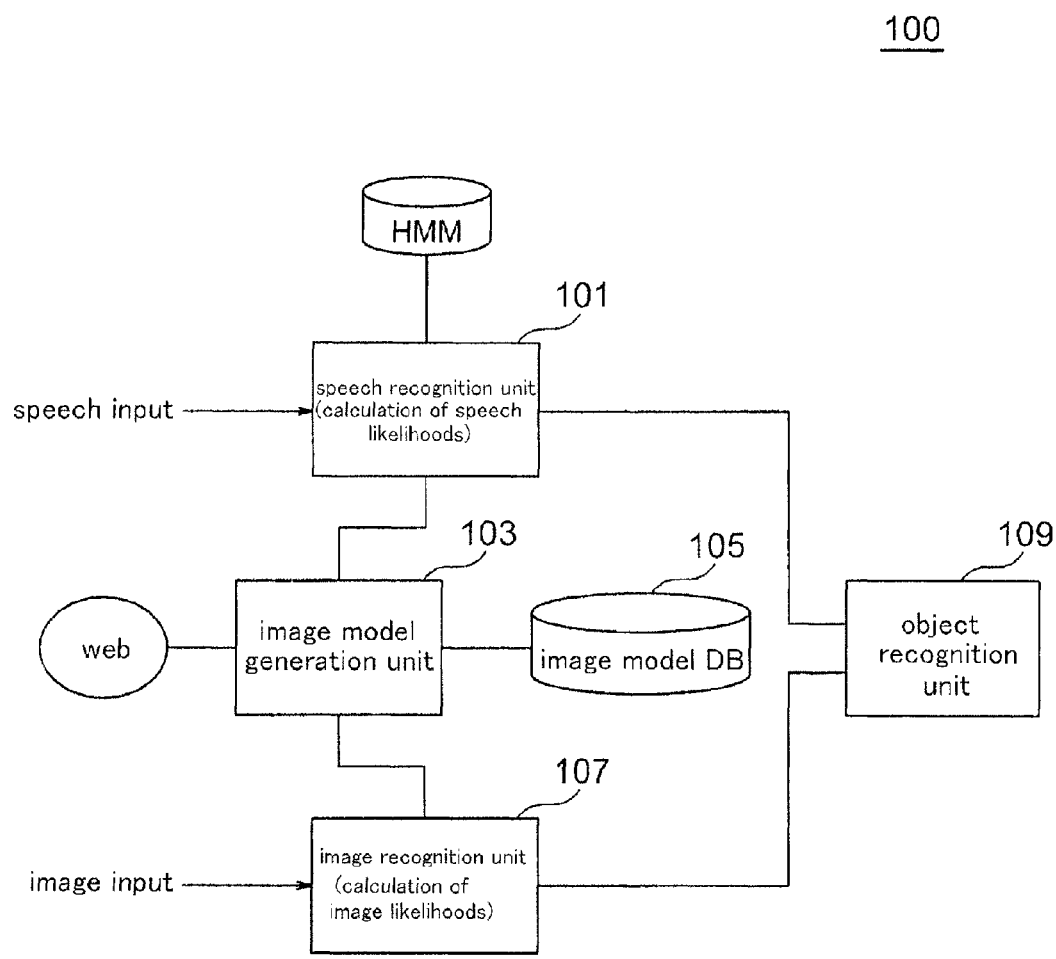
FIG. 1 shows a configuration of an object recognition system according to an embodiment of the present invention.

FIG. 1 shows a configuration of an object recognition system 100 according to an embodiment of the present invention. The system 100 includes a speech recognition unit 101 which receives speech input, and performs speech recognition to determine candidates for a result of the speech recognition (hereinafter referred to as "recognition result candidates") and their likelihoods (speech likelihoods). And the system includes an image model generation unit 103 for generating image models, an image model database 105, and an image recognition unit 107 which receives image input, performs image recognition by using the image models to determine a likelihood (image likelihood) that an object captured in the image input corresponds to each of the recognition result candidates. The system also includes an object recognition unit 109 which performs object recognition on the basis of the speech likelihoods and the image likelihoods. The speech recognition unit 101 is connected with HMM (Hidden Markov Model), and performs the speech recognition using the HMM. The image model generation unit 103 is connected with the image model database 105 and a world wide web (hereinafter, referred to as "web"), and generates image models using information from the image model database 105 and/or image information on the web. As is clear for a person skilled in the art, these units may be realized by a computer(s) executing a software program(s). The computer may comprise a processor(s) and a memory (or memories).

Figure 2:
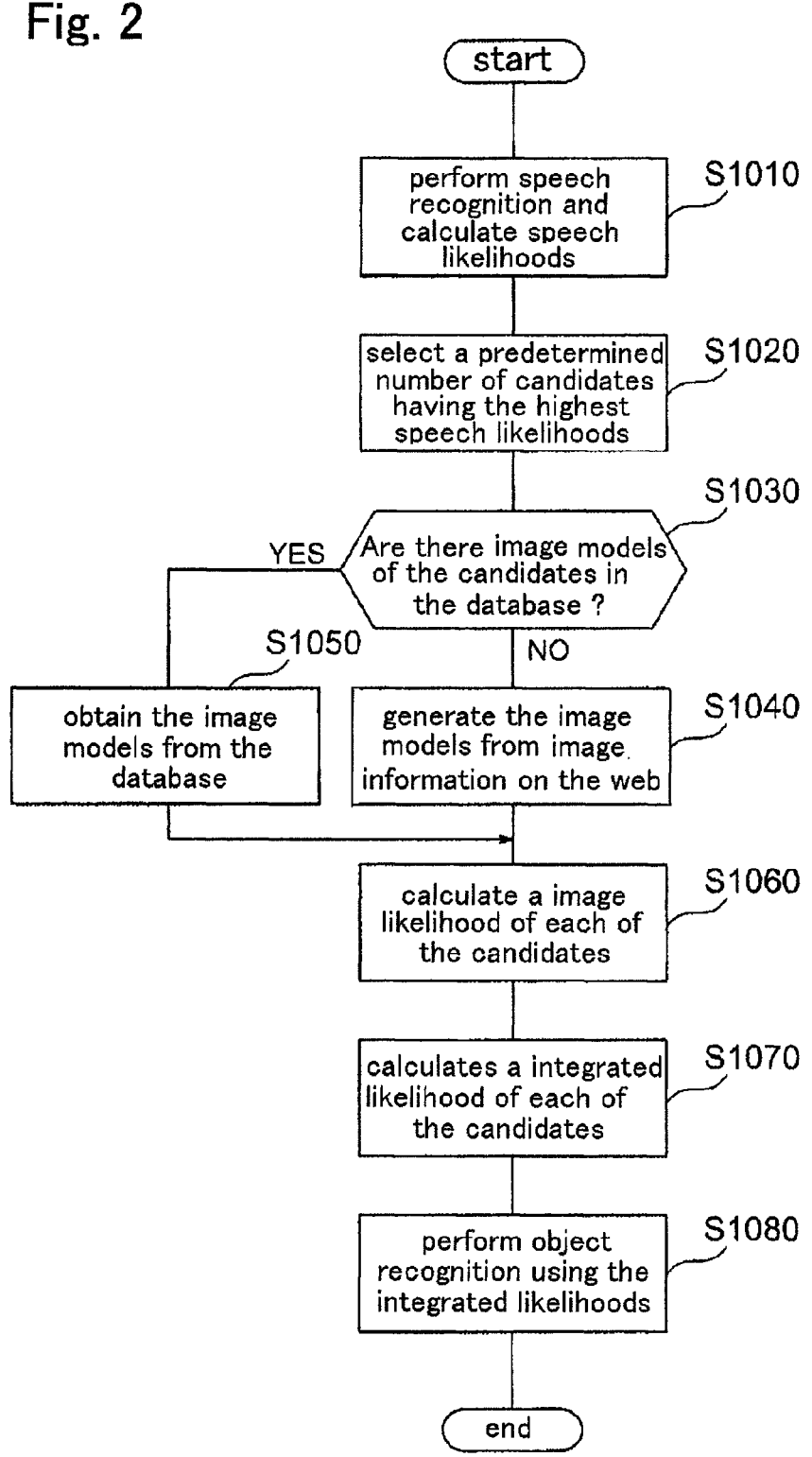
FIG. 2 is a flow diagram illustrating the operation of the object recognition system.

FIG. 2 shows a flow diagram illustrating the operation of the system 100.

At step S1010 in FIG. 2, the speech recognition unit 101 receives speech input and performs speech recognition with HMM, using MFCC (Mel Frequency Cepstrum Coefficient) as speech feature amounts. Then, the unit 101 calculates speech likelihoods $L_s(s; \Lambda_i)$ of the recognition result candidates, where s indicates speech input, and $\Lambda_i$ indicates a speech model for an i-th object.

At step S1020 in FIG. 2, the speech recognition unit 101 selects the recognition result candidates having ranks equal to or higher than a predetermined rank in the highest speech likelihood ranking of the recognition result candidates. For example, the predetermined rank is 10th. A reason for the selection of the recognition results candidates having the ranks equal to or higher than 10th is described below.

At step S1030 in FIG. 2, the image model generation unit 103 determines whether image models for the selected recognition result candidates having ranks equal to or higher than 10th of the ranking exist in the image model database 105. If the image models for the selected candidates exist in the database 105, the process proceeds to step S1050. Otherwise, the process proceeds to step S1040.

At step S1040 in FIG. 2, the image model generation unit 103 generates the image models from image information on the web. The way how to generate image models from image information on the web is detailed below.

At step S1050 in FIG. 2, the image model generation unit 103 obtains image models for the recognition result candidates from the image model database 105.

At step S1060 in FIG. 2, the image recognition unit 107 calculates image likelihoods $L_v(v; o_i)$ of the recognition result candidates, using the image models generated from image information on the web or using the image models obtained from the image model database 105.

At step S1070 in FIG. 2, the object recognition unit 109 calculates integrated likelihoods $F_L(L_s, L_v)$, by integrating the speech likelihoods $L_s(s; \Lambda_i)$ and the image likelihoods $L_v(v; o_i)$ with the following logistic function:

$$F_L(L_s, L_v) = \frac{1}{1 + e^{-(a_0 + a_1 L_s + a_2 L_v)}}, \quad (1)$$

wherein v indicates image input, $o_i$ indicates an i-th image model, and $\alpha_0, \alpha_1, \alpha_2$ indicate parameters of the logistic function.

At step S1080 in FIG. 2, the object recognition unit 109 performs object recognition using the integrated likelihoods, as described by the following equation:

$$\hat{\imath} = \arg\max_i F_L(L_s(s; \Lambda_i), L_v(v; o_i)). \quad (2)$$

Figure 3:
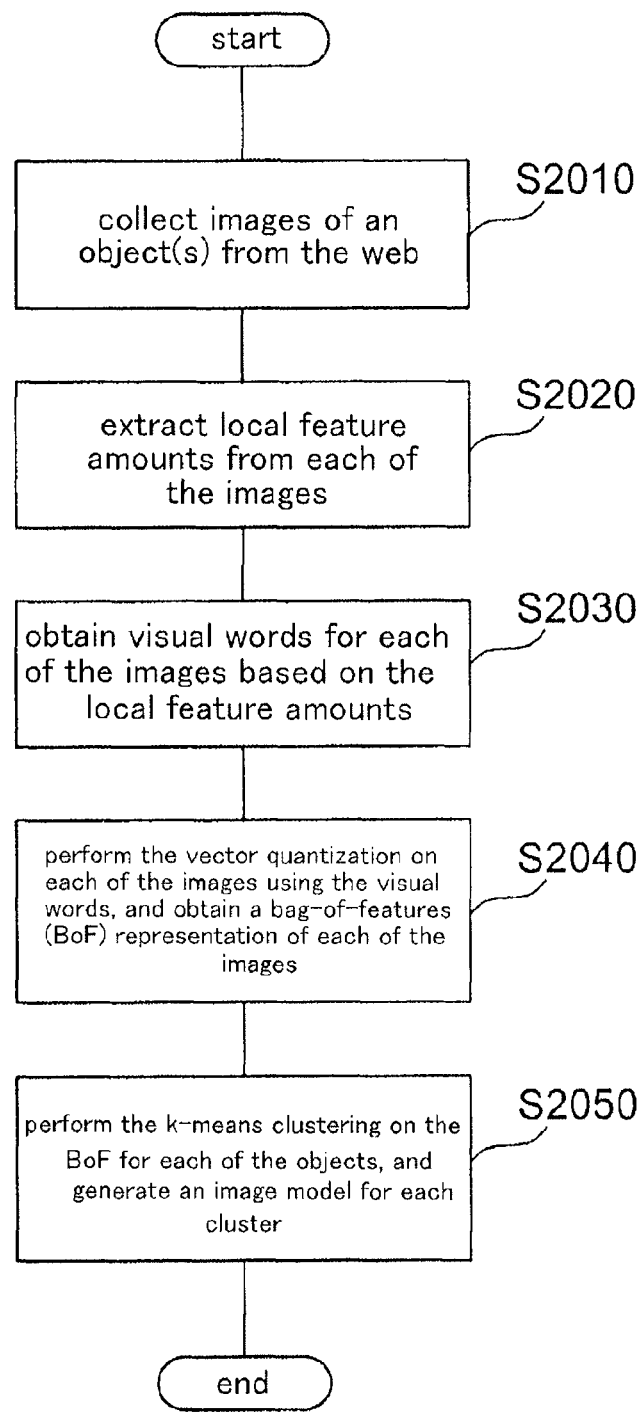
FIG. 3 is a flow diagram for explaining the details how to generate image models from image information on the web at step S1040 in FIG. 2.

FIG. 3 is a flow diagram for explaining the details how to generate image models from image information on the web at the step S1040 in FIG. 2.

At step S2010 in FIG. 3, the image model generation unit 103 collects images of each object of the recognition results candidates from the web.

At step S2020 in FIG. 3, the image model generation unit 103 extracts local feature amounts from each of the collected images, by means of SIFT (Scale-Invariant Feature Transform) (Lowe, David G. (1999). "Object recognition from local scale-invariant features". Proceedings of the International Conference on Computer Vision. 2. pp. 1150-1157.).

At step S2030 in FIG. 3, the image model generation unit 103 obtains visual words of each object based on the local feature amounts. Specifically, the unit 103 performs the k-means clustering on the local feature amounts SIFT of all the images and determines the centers of clusters as the visual words. The visual words represent local patterns.

At step S2040 in FIG. 3, the image model generation unit 103 performs the vector quantization on each of the image using the determined visual words, and obtains a bag-of-features (BoF) representation of each of the image. BoF is a representation of an image using frequencies (or a histogram) of visual words.

At step S2050 in FIG. 3, the image model generation unit 103 performs the k-means clustering on the BoF for each object of the recognition candidates, and generates an image model for each cluster.

Next, results of evaluation experiments about the speech recognition, the image recognition, and the recognition using the integrated features will be described.

In the speech recognition experiment, the isolated word recognition was performed, using Julius which is the large vocabulary continuous speech recognition engine for general purpose. Julius is a high performance open source software for development and research of a speech recognition system (http://julius.sourceforge.jp/). As an input feature vector, 12 dimensions of MFCC (Mel Frequency Cepstrum Coefficient), their differences (Δ), and the energy are used. Thus, the input feature vector has 25 dimensions. As learning data, phonetically balanced sentences and newspaper article sentences (130 speakers, 1.2 million sentences) are used. The number of states of the triphone HMM was 2000, and the mixed number was 16. The dictionary was formed with 1000 words extracted from the web. Utterances of 20 words repeated twice by subjects including 3 males and 2 females are used as the test data.

Table 1 shows recognition rates by speech.

TABLE 1

| Subjects | Recognition Rate | Worst Rank |
|---|---|---|
| Male 1 | 85.0% | 8th |
| Male 2 | 95.0% | 5th |
| Male 3 | 97.5% | 2nd |
| Female 1 | 95.0% | 2nd |
| Female 2 | 97.5% | 2nd |
| Average | 94.0% | |

"Worst Rank" in Table 1 indicates a worst value of the rank of the speech likelihood of a correct answer across the cases where the recognition error was occurred. At the time of occurrence of recognition error, a correct answer was at least on the rank better than 8th of the highest speech likelihood ranking of the recognition results candidates. Considering this result, the recognition result candidates having the ranks higher than 10th are selected at the step S1020 in FIG. 2.

Next, the image recognition experiment will be described. 100 images for each of 20 objects were obtained from the web, and the clustering was performed on each object according to the procedure shown by the flow diagram in FIG. 3. Re-ranking was performed on each cluster according to lengths from the center of gravity, and 80 images of each object were used for generating a image model of the object. One of remaining 20 images for each object which were not used for generating the image model was used as test data. The recognition rate obtained by means of the leave-one-out cross-validation was 92.75%.

Next, the experiment on the recognition using the logistic function as indicated by Equation (1), will be described. As learning data, 2000 sets of data each including a speech and an image both of which fit correct answers, and 2000 sets of data each including a speech and an image at least one of which did not fit correct answers, were used. The fisher scoring method is employed in the learning. The experiment was conducted by the leave-one-out cross-validation.

Table 2 shows the recognition rate by speech, the recognition rate by image, and the recognition rate by the integration.

TABLE 2

| Speech | Image  | Integration |
|--------|--------|-------------|
| 94.0%  | 92.75% | 100.0%      |

The recognition rate obtained utilizing the integration by the logistic function was higher than those obtained using only speech or only image. This means that the problem of recognition error which may occur in the recognition using only speech or only image was resolved by utilizing the integration.

In general, the recognition rate obtained by utilizing the integration features is expected to be improved, compared with those obtained by using only speech or only image. However, depending on circumstances, on the assumption that the correct answer is always included in a predetermined number of the speech recognition result candidates having the highest speech likelihoods, the object recognition may be performed based on the results of image recognition only on the predetermined number of the speech recognition result candidates having the highest speech likelihoods.

REFERENCE SIGNS LIST

100 object recognition system
101 speech recognition unit
103 image model generation unit
105 image model database
107 image recognition unit
109 object recognition unit

The invention claimed is:
1. An object recognition system comprising a processor and one or more memories,
  the processor configured to:
    determine candidates as a result of speech recognition on input speech and their speech likelihoods;
    get image models of a predetermined number of the candidates having the highest speech likelihoods;
    calculate image likelihoods of the image model that each image model corresponds to an input image; and
    perform object recognition using the image likelihoods,
  wherein, in the step of getting image models, the processor searches an image model database for the image model, and then, when the image model of the candidate is not found in the database, the processor gets said image model from image information on the web.
2. The object recognition system according to claim 1, wherein the processor performs the object recognition based on the speech likelihoods and the image likelihoods.
3. The object recognition system according to claim 2, wherein, at the time of getting the image models of the candidates from image information on the web, the processor performs clustering of feature amounts of images collected from the web, and gets an image model for each of clusters.
4. The object recognition system according to claim 1, wherein, at the time of getting the image models of the candidates from image information on the web, the processor performs clustering of feature amounts of images collected from the web, and gets an image model for each of clusters.
5. An object recognition method comprising steps of:
  determining candidates as a result of speech recognition on input speech and their likelihoods;
  getting image models of a predetermined number of the candidates having the highest likelihoods;
  calculating image likelihoods of the image models that each image model corresponds to an input image; and
  performing object recognition using the image likelihoods,
  wherein, in the step of getting image models, an image model database is searched for the image model, and then, when the image model of the candidate is not found in the database, said image model is gotten from image information on the web.

* * * * *